United States Patent [19]
Schmid

[11] Patent Number: 4,991,784
[45] Date of Patent: Feb. 12, 1991

[54] APPARATUS FOR GUIDING A CURVED STRIP

[76] Inventor: Hans A. Schmid, Ismaninger Strasse 66, 8000 München 80, Fed. Rep. of Germany

[21] Appl. No.: 280,905

[22] Filed: Dec. 7, 1988

[30] Foreign Application Priority Data

Dec. 7, 1987 [DE] Fed. Rep. of Germany ....... 3741403
Nov. 15, 1988 [DE] Fed. Rep. of Germany ....... 3838724

[51] Int. Cl.⁵ ............................................. B65H 75/18
[52] U.S. Cl. .................................. 242/55; 242/54 A; 74/89.22
[58] Field of Search ................. 242/54 A, 67.1 R, 55, 242/76, 118.4; 52/108; 74/89.22

[56] References Cited

U.S. PATENT DOCUMENTS

| | | | |
|---|---|---|---|
| 1,947,392 | 2/1934 | Guntermann et al. | 242/54 A |
| 2,297,525 | 9/1942 | Anheuser | 242/76 |
| 2,608,357 | 8/1952 | Brearton | 242/76 |
| 3,144,104 | 8/1964 | Weir et al. | 242/55 |
| 3,144,215 | 8/1964 | Klein | 242/54 A |
| 3,243,132 | 3/1966 | Taylor et al. | 242/54 A |
| 3,357,457 | 12/1967 | Myer | 242/54 A |
| 3,434,674 | 3/1969 | Groskopfs | 242/54 A |
| 3,508,587 | 4/1970 | Mauch | 52/108 X |
| 3,528,543 | 9/1970 | Robinsky | 52/108 X |
| 3,589,632 | 6/1971 | Rew | 242/55 |
| 3,608,844 | 9/1971 | Tumulty, Jr. et al. | 52/108 X |
| 3,811,633 | 5/1974 | Cummings et al. | 242/52 A |
| 4,047,339 | 9/1977 | Smith et al. | 52/108 |
| 4,589,601 | 5/1986 | Scherer | 242/55 |
| 4,775,907 | 10/1988 | Shtipelman | 74/89.22 X |

FOREIGN PATENT DOCUMENTS 2008 of 1862 United Kingdom ............ 242/118.4

Primary Examiner—John M. Jillions
Attorney, Agent, or Firm—Sughrue, Mion, Zinn, Macpeak & Seas

[57] ABSTRACT

An apparatus for guiding a strip consisting of a stiff material and cambered in the transverse direction includes a rotary member having a contact surface against which at least a portion of the strip bears in such a way that in that portion the strip exhibits a longitudinal curvature about at least one transverse axis, with the transverse camber being at least reduced resiliently. In order for the strip to be supported on the apparatus in a substantially play-free and slip-free manner so that the strip can carry a compression loading in a longitudinal direction thereof towards the apparatus, the apparatus further includes first and second lateral support surfaces which are disposed in mutually opposite relationship on respective sides of the contact surface and which are inclined towards each other so as to converge in an outward direction. The support surfaces are so arranged that each portion of the strip which passes into the longitudinally curved region thereof, due to the increase in width which it experiences as a result of the transverse camber being at least substantially reduced, is immovably gripped in a resiliently reversible manner between the contact surface and the first and second lateral support surfaces.

24 Claims, 7 Drawing Sheets

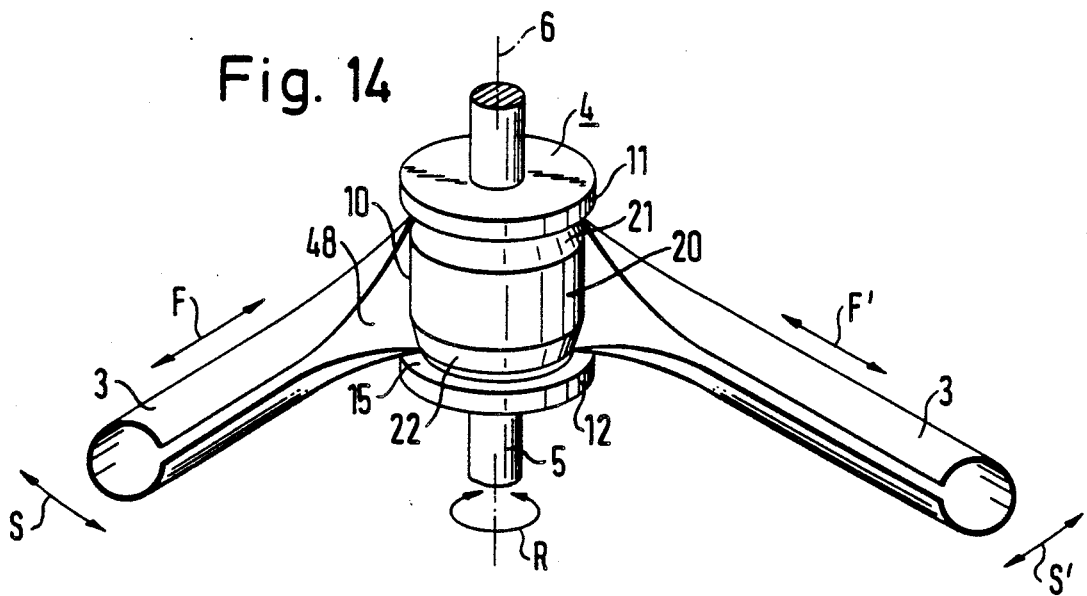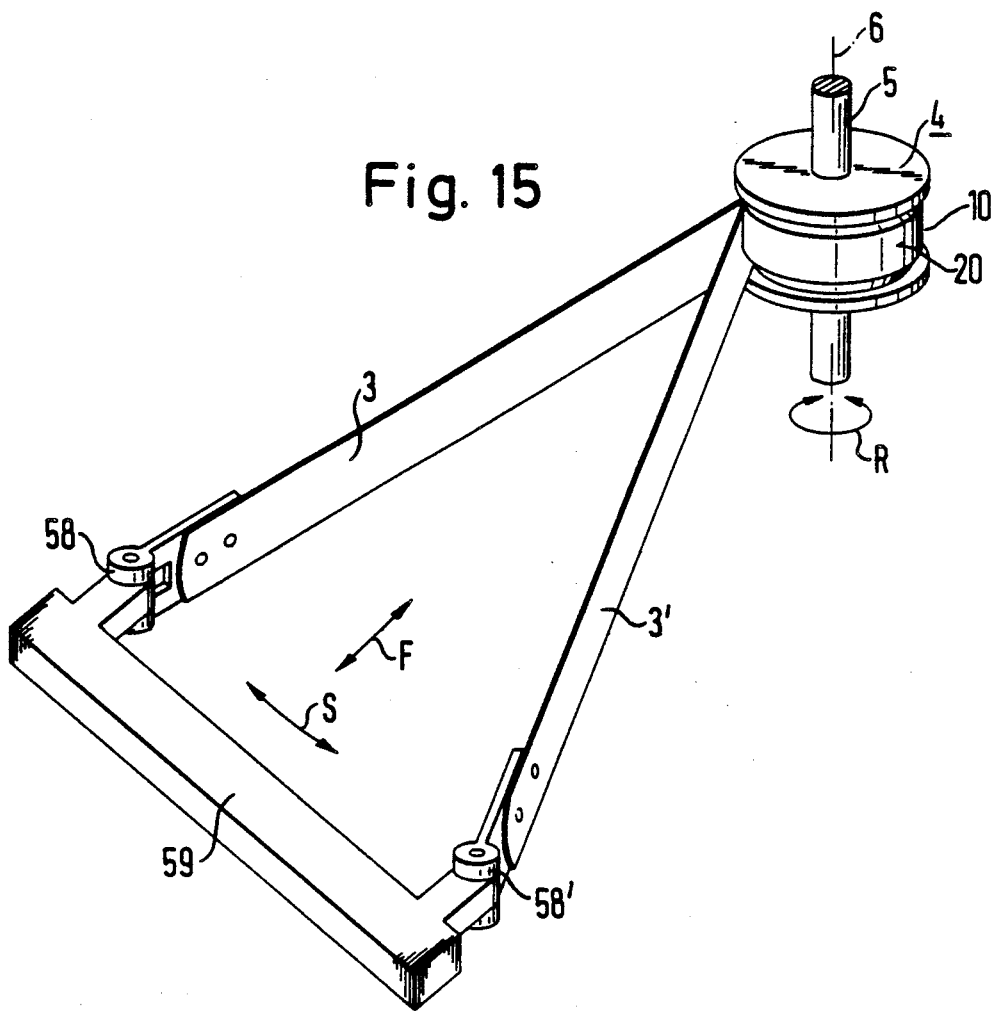

APPARATUS FOR GUIDING A CURVED STRIP

BACKGROUND OF THE INVENTION

The invention relates to an apparatus for guiding a curved strip consisting of a stiff material.

An apparatus for guiding a curved strip of a stiff material, as disclosed for example in U.S. Pat. No. 3,243,132, comprises a cylindrical drum having a peripheral surface which forms a contact surface against which at least a portion of the strip lies in such a way that, in that portion, the strip is of a curved configuration about a transverse axis, with the transverse curvature of the strip being resiliently removed. When the strip is wound around the peripheral surface of the cylindrical drum in a plurality of layers, the peripheral surface of the drum forms the contact surface for the innermost layer or turn of the wound strip, while the contact surface for each of the outer layers or turns of strip is formed by the outward surface of the respective next inward layer or turn of the strip. So that the strip which is of a curved or cambered configuration, being therefore resiliently prestressed in such a way that it is curved about its longitudinal axis, can be wound on to and unwound from the drum in a fairly well-defined manner, disposed upstream of the peripheral surface of the drum is an arrangement of clamping and guide rollers which are pressed against the wide sides of the strip and which ensure that, as the strip is wound on to or off the drum, the strip cannot tilt about its longitudinal axis or bulge outwardly, if the part of the strip which is not wound on the drum is subjected to a compression loading in the longitudinal direction of the strip towards the drum.

However, that construction does not make it possible to provide for a precisely defined, that is to say slip-free, conversion of the rotary movement of the drum into a linear movement of the strip end which is the 'free end', that is to say, the end which is not secured to the drum, or vice-versa. In addition, the clamping and guide rollers give rise to frictional losses which cause problems in many situations of practical use.

SUMMARY OF THE INVENTION

An object of the present invention is to provide an apparatus for guiding a stiff strip of transversely cambered configuration, in such a way that the strip can be supported and guided on the apparatus in a substantially play-free and slip-free manner so that it can be subjected to a pressure loading in the longitudinal direction towards the apparatus, and without involving major frictional losses.

Another object of the present invention is to provide an apparatus for guiding a strip of a stiff material and of a cambered configuration, through a change in direction of movement of the strip, by means of a generally non-complicated arrangement and with a high level of operational reliability.

In accordance with the invention these and other objects are achieved by an apparatus for guiding a strip of a generally stiff material and of a cambered configuration about its longitudinal axis, comprising at least one contact surface against which at least a portion of the strip lies in such a way that, in that portion, the strip is of a longitudinal curvature about at least a transverse axis, with the transverse curvature or cambering being at least substantially resiliently removed. The apparatus further comprises first and second lateral support surfaces in mutually opposite relationship in the direction of the transverse axis, the support surfaces being inclined towards each other to converge away from the axis around which the contact surface extends, the support surfaces also being so arranged that, by virtue of the width of the strip being increased because of the reduction in its transverse curvature, the portion of the strip extending around the contact surface and between the support surfaces is clamped substantially immovably in a resiliently reversible fashion between the contact surface and the lateral support surfaces.

To assist with understanding of the present invention, it will be noted at this point that the above-defined arrangement of the invention is based on the following realisation: a strip which is curved or cambered in its transverse direction is curved about an axis which is parallel to its longitudinal direction, when the strip is left to its own devices. In that situation, in order to simplify the following considerations, the apex of the camber or transversely curved configuration will be referred to as being directed upwardly, thus forming the top of the curvature, while the edges of the strip will be referred to as being downward and thus forming the bottom edges of the curved configuration, although it will be appreciated that it is possible to involve any other orientation of the strip in space, giving the same results.

If now a portion of such a strip is curved about an axis which extends transversely to its longitudinal direction, as necessarily occurs when a portion of a strip is caused to bear against a correspondingly curved contact surface such as the peripheral surface of a drum, then that portion of the strip undergoes an increase in its width because the transverse curvature or camber is pressed at least substantially towards a flat configuration. As a result, the side edges of that portion of the strip move outwardly and away from each other and also move upwardly relative to the plane which is tangential to the apex of the curvature. That lateral and upward movement of the edges of the strip is utilised in accordance with the principles of the invention to cause at least one of the side edges of the respective strip portion to come into engagement with the lateral support surfaces of the apparatus, in such a way that that strip portion is resiliently gripped between the support surfaces and the contact surface.

It has been found that an important advantage of the apparatus according to the invention is that the transitions from a non-clamped to a clamped condition of the strip portion and vice-versa occur in the form of rolling procedures in which the respective surfaces of the strip come to bear against and lift away from the contact and support surfaces in a friction-free and slip-free fashion. It is therefore only necessary to apply the energy required for producing resilient deformation of the strip, but that energy is practically entirely liberated again when that deformation of the strip is reversed, as cambered or curved strips can readily be made from materials with an extremely low level of resilient hysteresis. As the lateral support surfaces of the apparatus according to the invention come into engagement with the edge regions of the strip portions only, the flat sides of the strip remain freely accessible without being covered by any roller arrangements.

In the case of the apparatus of U.S. Pat. No. 3,243,132 the contact surface is formed by the peripheral surface of a circular-cylindrical, rotatably mounted rotary member on to which the strip can be wound and from which it can be unwound. The apparatus according to the invention may be of a corresponding configuration, but it is not limited thereto. The contact surface of the apparatus according to the invention does not have to be rotationally symmetrical, but it only has to be curved or cambered about at least one axis which extends transversely with respect to the longitudinal direction of the strip. The radius of curvature of the contact surface may vary in the longitudinal direction of the strip and convexly and concavely curved portions may occur in alternate succession. The only important consideration in this respect is that, when the strip comes to bear against the various parts of the contact surface, the strip in each case at least partially loses its transverse curvature, thus resulting in the increase in strip width required for the strip to be clamped between the contact surface and the lateral support surfaces.

The lateral support surfaces may be arranged at such a spacing from each other that a strip portion which is still cambered in the transverse direction can comfortably pass into a position between them, in order then to come to bear with one side surface against a support surface of the apparatus and with the other side surface against the other support surface, when the width of the strip is subsequently increased in the above-indicated fashion.

Alternatively however, it is also possible for one of the side edges of the strip to have a bent portion which is curved in the opposite direction to the curvature of the transverse camber of the strip and which is retained when the transverse camber of the strip portion is resiliently reduced. In that way the two lateral support surface and the contact surface may be so arranged in the region of that side edge of the strip that they form the boundary surfaces of a guide groove; when the transverse camber of the strip is resiliently reduced, the edge region of the strip which adjoins the above-mentioned bent portion in an outward direction moves into the guide groove in order to be clamped therein.

Although it is possible for the member which provides the contact surface and the lateral support surfaces to be mounted rotatably, in appropriate situations of use that is not a configuration that necessarily has to be adopted.

At any event, the arrangement is one in which one or more strips bear against a guide apparatus provided with the above-mentioned surfaces in accordance with the invention, in order to be guided therearound or to be wound on to and unwound from same, being connected to the guide apparatus in such a manner as to resist compression and tensile forces applied thereto, in each case up to the limit of elasticity of the material.

In a preferred form of use of the apparatus according to the invention, it is used as a direction-changing or guide roller. In that construction the guide apparatus is generally formed as a rotary member, in the form of a right circular cylinder which is mounted rotatably about an axis which coincides with the axis of the cylinder. A recess in the peripheral surface of the rotary member is then preferably formed as a groove extending around the entire periphery of the cylinder. In this case the contact surface which is disposed in the interior of the groove is preferably formed as a peripheral surface of a right circular cylinder, the axis of which coincides with the axis of rotation of the rotary member. The strip engages into the groove over a comparatively short portion of the length of the strip only and the two ends of the strip may be employed as free ends; in that case, a member which is generally guided along a predetermined path can be connected to each of those ends, so that the movement of one such member is coupled to the movement of the other member connected to the respective other end of the strip.

Alternatively the two free ends of the strip may also be connected together and passed around one or more further direction-changing guide rollers which are either in the form of simple rollers or in the form of rotary members of the kind just referred to above. That construction in which the strip passes in the form of an endless strip around two or more direction-changing rollers may be used as the chassis gear of a caterpillar-type vehicle or as a belt transmission arrangement in which the ratios of the speeds of rotation of the individual direction-changing rollers depend in known manner on the ratios between their circumferential lengths. In comparison with known belt transmission arrangements, such an arrangement provides that the connection between the cambered strip and at least the direction-changing rollers which are constructed in accordance with the principles of the guide apparatus according to the invention is extremely slip-free and play-free, and only extremely low frictional forces occur when the respective portions of the strip are gripped between the contact and support surfaces of the apparatus when passing around the rollers which provide those surfaces, and when the strip comes away from those rollers. In that case, the arrangement can be subjected to a compression loading in the direction of the connecting lines defined by the moving strip, at least between the direction-changing rollers which are constructed in accordance with the principles of the guide apparatus of the invention.

The above-mentioned construction in which each of the two free ends of the strip is connected to a movable member which is suitably guided in an appropriate predetermined guide arrangement can be used as a transmission assembly if the guide apparatus is not simply in the form of a direction-changing roller which is mounted freely rotatably about its axis of rotation, but is connected to a drive motor of an appropriate configuration and the rotary movement of which is to be converted into the intercoupled translatory movements of the members connected to the free ends of the strip. Conversely, the movement of those members may also be converted into a rotary movement which is taken off at the roller constituting the guide apparatus, or a shaft non-rotatably connected thereo.

In another embodiment of the guide apparatus of the invention, which can be used as a transmission arrangement, one of the two ends of the strip is fixedly connected to the guide apparatus which is in the form of a winding member while the other free end of the strip is connected to a member which is guided in some suitable fashion. In that construction which may also involve the strip being wound in a plurality of turns on to the winding member, the movement of the movable member connected to the free end of the strip is coupled to the rotary movement of the winding member in an extremely slip-free and play-free fashion. In most situations of use of that kind the winding member is again in the form of a right circular cylinder, but other forms can also be envisaged in that respect. That applies in particular in regard to the configuration of the contact surface which, when the arrangement is intended to provide for winding of the strip in a plurality of turns, is preferably not in the form of a right circular cylinder but in the form of a right spiral cylinder. If the peripheral surface of a right spiral cylinder of that kind is limited to a circumferential angle of 360°, as is necessarily the case in relation to a winding member of solid construction, then such a contact surface at a given location has a change in level in the form of a radial step, the height of which is preferably equal to the thickness of the cambered strip used. The end of the strip which is secured to the winding member is then arranged in the groove in such a way that it directly adjoins the step so that the radially outward surface of that end region of the strip constitutes a prolongation of the contact surface which is directly provided by the winding member itself and which actually terminates at the step in the peripheral surface thereof. That arrangement provides a constant relationship between the movement of the free end of the strip and the angle of rotary movement of the winding member.

Alternatively the contact surface or surfaces may also be of such a configuration that strip portions which are wound on to or which bear snugly against the contact surface form at least a part of the peripheral surface of an inclined circular cylinder, a cylinder of another cross-sectional shape, a truncated cone or a surface which is of a barrel-like or cushion-like cross-sectional configuration.

A third preferred situation of use of the apparatus according to the invention is as a pivot, in which once again an end of the strip is secured to a winding member or both ends of the strip constitute free ends. In the first case it is only possible for two members to be pivotally connected together, one thereof being fixedly connected to the winding member and the other being fixedly connected to the free end of the strip. In that arrangement the winding member may be entirely fixedly connected to the member associated therewith, or it may be only non-rotatably or only linearly displaceably fixed thereto. Depending on the desired pivotal movement, a wide range of different cross-sectional configurations can be envisaged in this case for the contact surface. In those situations of use, in particular when the pivotal movement is to extend over an angle which is substantially less than 360°, the contact surface may be disposed in a recess which extends only over a correspondingly short part of the periphery of the peripheral surface of the winding member.

If both ends of the strip are free ends, the arrangement may be used as a pivotal connection between two or three members. In the former case the two members which are to be pivotally connected together are secured to respective ones of the two ends of the strip and the guide apparatus of the invention only serves to define the pivot point or pivot axis, while in the latter case the guide apparatus is secured to the third member which is to be pivotally connected.

It should be expressly pointed out that a particular advantage of the apparatus of the invention is that it can be used to provide not only pure rotary pivots with a fixed axis of rotation, but also pivot constructions in which, in addition to the rotary movement, it is also possible to provide for defined translatory relative movements between the two members which are pivotally connected together.

A further and quite decisive advantage of the apparatus according to the invention is that, as can be seen from the foregoing description of preferred situations of use thereof, such situations do not necessarily have to be carried into effect separately from each other. On the contrary, the apparatus according to the invention enjoys an enormous range of uses by virtue of the fact that it can be used in a combined fashion, for example to constitute a pivot arrangement and a transmission arrangement at the same time.

The options of use of the apparatus according to the invention can be further increased by a plurality of curved or cambered strips being guided around one and the same guide apparatus or being wound on to and unwound from one and the same winding member constituted by the guide apparatus according to the invention. In principle that can be done by each of the curved or cambered strips having its own group of contact and lateral support surfaces, wherein both the length and the form of the contact surface for each strip may be different. Alternatively, two or more strips may be clamped at the same lateral support surfaces or may be wound on to the apparatus in one and the same recess provided in the peripheral surface thereof, in which case the radially outward surface of the respectively inward strip forms the contact surface for the respective next outward strip.

Preferably the above-mentioned options may also be combined together, for example in such a way that one and the same member has a plurality of groups of surfaces (contact surface and first and second support surfaces) or recesses, of which some only serve to guide and/or wind on a single strip, while other groups of surfaces can guide two or more strips or two or more strips can be wound in other recesses.

It will be apparent that, in all the above-described situations of use, a relative movement occurs between the curved or cambered strip and the guide apparatus, in such a way that strip portions which hitherto were not in engagement with the guide apparatus and which, by virtue of the cambered configuration, have their 'normal' curvature in the transverse direction, are gripped between the contact and support surfaces, with the transverse curvature being at least partially removed and the strip being curved in the longitudinal direction at the same time, and/or in such a way that strip portions which were previously gripped and thus curved in the longitudinal direction lift away from the contact and support surfaces, whereby their longitudinal curvature disappears and they are restored again to their 'normal' transversely cambered configuration.

The procedure involved in the strip portion being gripped between the contact and support surfaces, which takes place when a strip portion which hitherto was not in engagement with a winding member having a recess, constituting a guide apparatus in accordance with the principles of the invention, engages into the recess in the winding member, will be described in greater detail hereinafter. In that connection, it is firstly assumed that the bottom of the recess in the winding member forms the contact surface against which the strip portion that is newly passing into the recess is to bear. As long as the strip portion is still sufficiently far away from the winding member, it is exclusively of the 'normal' transversely curved configuration which is due to the camber thereof, and it extends entirely in a straight line in its longitudinal direction. In comparison, strip portions which are already being pressed against the contact surface of the winding member are curved in the longitudinal direction and have been pressed into a substantially flattened configuration in the transverse direction. It will be clear that the region on the strip at which the strip tangentially approaches the contact surface will involve a transitional zone in which, as viewed towards the contact surface of the winding member, the transverse camber of the strip portion progressively decreases. The narrowest cross-sectional part of the recess in the winding member must be of such a size that the strip which is still in a condition of being almost completely cambered in the transverse direction and thus being of a correspondingly small width can readily engage into the recess and come to bear tangentially against the contact surface formed by the bottom thereof. When the strip portion in question has engaged into the recess, it is at any event already pressed flat in its transverse direction to such a degree that its side edges or surfaces face downwardly towards the bottom of the recess and the strip comes to bear with its side edges leading against the bottom of the recess. Due to the strip assuming a curved configuration in its longitudinal direction, with such curvature increasing as the strip portion is increasingly caused to bear against the contact surface formed by the bottom of the recess, the transverse camber of the strip is flattened in a progressively increasing fashion so that the side edges of the strip portion engaging the winding member move outwardly towards the lateral inside surfaces defining the recess. At the location where the side edges of the strip portion are to be found, when the transverse camber thereof has been almost entirely flattened, the spacing of the inside surfaces of the recess is somewhat less than the width of the strip portion when in its entirely flattened condition. That means that, at the same time as the strip portion comes to bear against the contact surface, its side edges or surfaces spread out between the side walls of the recess and come to bear against the side walls of the recess, in such a way that the strip is fixed in position in the recess in a very stable fashion such as in particular to allow it to be subjected to a compression loading in the longitudinal direction of the strip.

The very low frictional forces which occur in the course of the above-described procedure, between the outwardly moving side edges or surfaces of the strip and the bottom of the recess in the winding member, can be further increased, in an advantageous fashion, if it is not the bottom of the recess itself that acts as the contact surface, but the outside surface of at least one raised portion which is provided within the recess. The raised portion is arranged in such a way that its outside surface, as considered in the transverse direction of the strip, occupies only a part of the width of the recess, so that a groove or channel extending in the longitudinal direction is formed on both sides of the raised portion between same and the associated side wall of the recess. The two grooves or channels formed in that way can then receive the side edges or surfaces of a strip portion which is still of a transversely cambered configuration, when it passes into the recess; then, due to the transverse camber being flattened to an increasing degree, the side edges or surfaces of the strip can move outwardly towards the side walls but, in so doing, without coming into contact with the bottom of the recess or other parts of the winding member. The side edges or surfaces of the strip come into contact with the winding member, in the form of a rolling movement, practically only at the moment at which the side edges or surfaces of the strip spread out to such an extent as to be engaged between the side walls of the recess, which constitute the support surfaces.

Further features and advantages of the apparatus according to the invention will be more clearly apparent from the following description of preferred embodiments thereof.

BRIEF DESCRIPTION OF THE DRAWINGS

Embodiments of the invention will now be described by way of example with reference to the accompanying drawings.

FIG. 14 shows a further construction using an apparatus according to the invention with a rotary member and a strip which is passed therearound, with two 'free' ends, as a pivot arrangement and/or a transmission arrangement or direction-changing roller, FIG. 15 shows a construction in which first and second strips which can be wound on to a common winding member are pivotally connected by their free ends to a rigid member.

DESCRIPTION OF PREFERRED EMBODIMENTS

Figure 1:
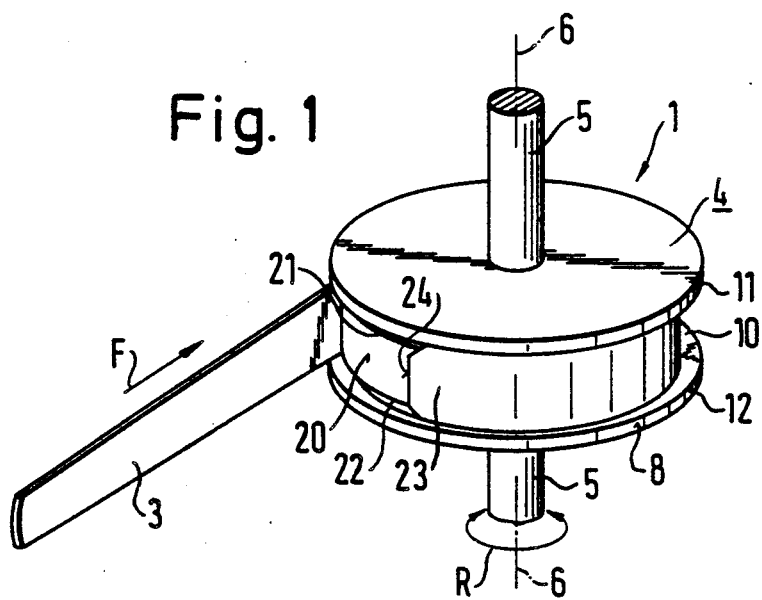
FIG. 1 is a perspective view of a first embodiment of the apparatus of the invention, in which a strip with a slight degree of transverse camber can be wound on to and unwound from a winding member.
Figure 2:
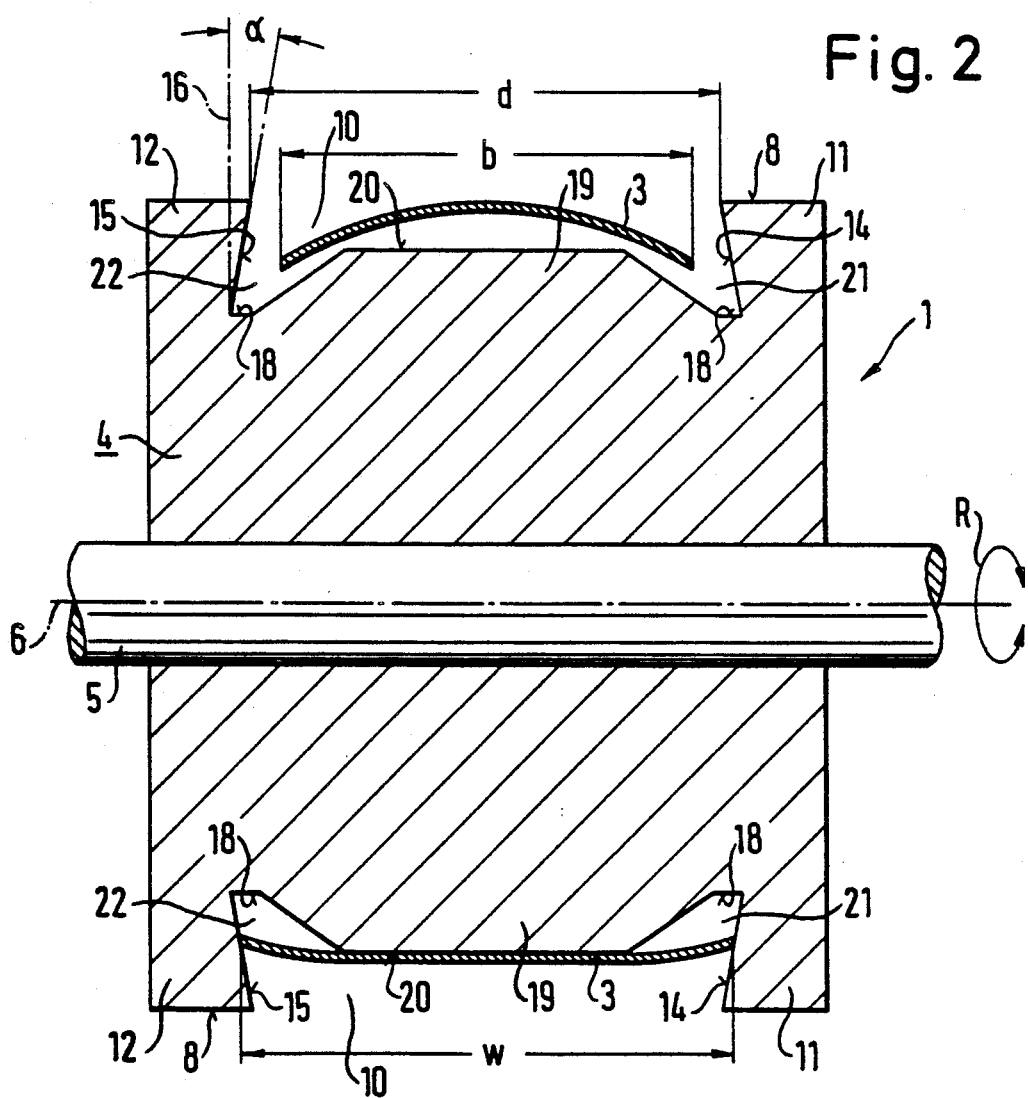
FIG. 2 is a view on an enlarged scale and in radial section through the winding member of FIG. 1.

Referring firstly to FIGS. 1 and 2, illustrated therein is an apparatus 1 for guiding a transversely curved or cambered strip 3 which comprises a stiff material. The apparatus 1 includes a rotary member indicated in the form of a winding member 4, which is arranged on a shaft 5 rotatably about an axis of rotation 6 in the direction indicated by the double-headed arrow R. The winding member 4 serves not only to guide the strip in the transverse direction and support it in the longitudinal direction, but it also serves for winding the cambered strip 3 on to and off the member 4.

In the present context, the reference to a transversely curved or cambered strip 3 means a strip of a stiff material which is of a curved configuration transversely with respect to its longitudinal direction, which curved configuration can be flattened by the application of suitable forces without the strip 3 leaving its range of elasticity. That means that, when the forces flattening the strip are removed, the strip 3 returns to its curved cross-sectional configuration again, as can be clearly seen in particular from the upper part of FIG. 2.

In the embodiment of the apparatus shown in FIGS. 1 and 2, the winding member 4 is in the form of a right circular cylinder whose external peripheral surface as indicated at 8 in FIG. 2 has a groove 10 which extends in the circumferential direction of the cylinder around the entire circumference thereof. The groove 10 also extends over at least a substantial part of the axial height of the winding member 4 and preferably over almost the entire axial height thereof. In that way the axially facing upper and lower sides of the member 4 are each formed by a respective flange region 11 and 12 in the form of circular discs, each thereof being connected in one piece to the central region of the member 4, which is disposed between the portions 11 and 12. Alternatively however the portions 11 and 12 could also be in the form of suitably shaped discs which are then fitted to the central portion of the member 4, being suitably connected thereto for example as by riveting or screwing. In that case it is also possible for at least the parts of the disc portions 11 and 12 which project radially outwardly beyond the central portion of the member 4 to be so thin that they can move resiliently towards or away from each other in the axial direction of the member 4.

As can be seen more particularly from FIG. 2, the groove 10 has side walls which in this embodiment form first and second lateral support surfaces indicated at 14 and 15. The side walls of the groove 10 are inclined relative to the direction which is perpendicular to the axis of rotation 6 and which is indicated by a line 16 in FIG. 2, at an acute angle as indicated by $\alpha$ which may be for example of the order of magnitude of from 5° to 10°, in such a way that the side walls of the groove 10 converge away from the axis of rotation 6 towards the outside surface 8 of the winding member 4.

It should be appreciated that the angle $\alpha$ is not restricted to the above-indicated range but in principle it can be of any value of between 0° and 90°.

Extending radially outwardly from the bottom of the groove 10, as indicated at 18, is a raised portion 19 which extends therefore around the entire periphery of the member 4 and which provides a peripheral surface 20 forming the innermost part of the above-mentioned contact surface against which the strip portions which are wound on to the member 4 come to bear. The surface 20 is in the form of a peripheral surface of a right spiral cylinder. The spacing of any point on the peripheral surface of that cylinder from the axis of rotation 6 is smaller than the radius of the circular cylinder defining the outer surface 8 so that the peripheral surface 20 is within the groove 10.

In the embodiment illustrated in FIGS. 1 and 2 the peripheral surface 20 extends in an axial direction over rather more than half the axial width, as indicated at w in FIG. 2, of the groove 10 at that radial spacing from the axis of rotation 6. Adjoining the axial end points of the surface 20, the raised portion 19 drops away to the bottom 18 of the groove 10 so that channels or grooves 21 and 22 respectively of increased depth, extending in the peripheral direction of the member 4, are provided within the groove 10 on both sides of the raised portion 19 between same and the respectively adjoining side walls of the groove 10.

One end 23 of the strip 3 is fixed within the groove 10 in such a way that it bears in a substantially flat configuration against the peripheral surface 20, with the transverse camber of the strip being almost completely removed, as shown in the lower part of FIG. 2. The end edge 24 (see FIG. 1) of the strip 3 is arranged in a position of being sunk in the surface 20 by virtue of that end edge 24 adjoining a step formed in the peripheral surface of the right spiral cylinder. The radial height of that step is at least substantially equal to the thickness of the strip, thus providing an entirely smooth transition from the peripheral surface 20 to the radially outwardly disposed surface of the strip 3 adjoining same, which thus constitutes a prolongation of the peripheral surface 20 and thereby forms a contact surface for the further portions of the strip which are to be wound on to the member 4.

The lower part of FIG. 2 shows the condition of the strip 3 not just in the region directly adjacent to the end 23. On the contrary, with the exception of a short transitional region which is not shown in FIGS. 1 and 2 and which constitutes the transition between the condition of being wound on to and unwound from the member 4, insofar as the strip is wound thereon, the strip 3 bears in the manner shown in the bottom part of FIG. 2 against the surface 20 defined by the raised portion 19 or, when the strip is wound in a plurality of turns on the member 4, the strip 3 bears against further parts of the contact surface, which are defined by the outwardly facing surface of the strip portions which have already been wound thereon. In regard to the view in the lower region of FIG. 2, it will be seen that the strip 3 is still slightly curved towards the axis of rotation 6, in the same direction as its original transversely cambered configuration, only in the side edge regions which project beyond the surface 20 in the axial direction of the member 4.

The forces which are required to press the strip 3 substantially flat, thereby removing its normal transverse curvature formed by the cambered configuration, are in no way applied exclusively by virtue of the strip 3 being fixed in the groove 10. On the contrary, those forces which flatten the strip 3 occur by virtue of the fact that, when the strip 3 is wound on to the winding member 4, the strip 3 is curved in a direction which is perpendicular to its transverse curvature, that is to say, in the longitudinal direction of the strip. The smallest radius of curvature of the surface 20, relative to the axis of rotation 6, is made somewhat larger than the camber radius of the strip 3. That dimensioning provides that the strip portions which pass into the groove 10 when the strip 3 is wound on to the member 4 are deformed in such a way that they bear snugly and smoothly against the contact surface formed by the peripheral surface 20 of the member 4 or the corresponding outwardly facing surface of a strip portion which has already been wound on to the member 4, and, when the portion of strip 3 which has not been wound on to the member 4 is subjected to a compression loading in the longitudinal direction towards the member 4, the strip portions which are wound on to the member 4 exhibit no tendency to break away from the member 4 in a 'rearward direction', in the direction indicated by the arrow F in FIG. 1, which would result in the formation of a kink, thus forming an outwardly projecting bulge. As can be seen from FIG. 1, the strip 3 is tapered towards its end (not shown) which is not fixed to the member 4 in order thereby to provide for adaptation to the radially outwardly decreasing width of the groove 10, in respect of the portions of the strip 3 which, when the strip is wound on to the member 4 in the groove 10, do not come to bear against the surface 20 but rather come to bear against parts of the contact surface configuration defined by the outwardly facing side of the strip portions which have already been wound on to the member 4.

As can be seen from the lower part in FIG. 2, the width w of the groove 10 in the radial region in which the side surfaces of the strip 3 which bears against the contact surface (in this case formed by the peripheral surface 20) and which is almost entirely flattened in the transverse direction is such that it is somewhat smaller than the width that the strip 3 would assume if it were entirely flattened in the transverse direction. In that way the side surfaces of the strip which, as shown in the upper part of FIG. 2, when the strip 3 which is still cambered in the transverse direction passes into the groove 10, initially engage into the channels or groove portions 21 and 22 and then, when the strip 3 comes to bear against the surface 20, move towards the side walls of the groove 10 which form the lateral support surfaces 14, 15, and move radially outwardly again, are pressed radially outwardly against the support surfaces 14 and 15, in a friction-free rolling movement, and are thus gripped between the surfaces 14 and 15. The static friction which occurs between the side edges of the strip and the lateral support surfaces 14 and 15, in conjunction with the static friction forces between the underside of the strip and the surface 20, provide that the strip is wound on to the member 3 in a slip-free and play-free manner.

So that a corresponding effect can also be provided in respect of strip portions which are not wound directly on to the surface 20 but which are wound at a radially somewhat further outward position on to strip portions which have already been wound on to the member 3, the width of the strip 3 is adapted by virtue of the above-mentioned tapering configuration thereof to the spacing between the support surfaces 14 and 15, which decreases in a radially outward direction.

It should be noted that there is no need for the strip 3 to be tapered towards the free end thereof, in the above-indicated manner, if as mentioned above the outwardly projecting flange portions 11 and 12 are of such a nature that they can move resiliently apart in the axial direction of the member 4.

So that the parts of the strip 3 which are still in a rectilinear configuration in the longitudinal direction thereof can readily pass into the groove 10 in the operation of winding the strip 3 on to the member 4, as shown in the upper part of FIG. 2 the smallest spacing d between the lateral support surfaces 14 and 15 is larger than the width b of the strip portion which is passing into the groove 10 and which is still transversely cambered.

The above-described configuration of the strip 3 and the winding member 4 and in particular the groove 10 provided in the latter provides an apparatus for providing a coupling effect between a translatory movement and a rotary movement, which permits conversion between those two forms of movement in an extremely low-play and low-loss fashion. The arrangement is stable in respect of compression forces in the direction indicated by the arrow F, up to the bending or buckling limit of the strip 3, as the strip 3 buckles rather than lift away from the surface against which it bears in the groove 10. In that connection it is particularly advantageous that such buckling of the strip 3 is reversible and the strip 3 returns to its original shape again when the compression overloading is removed. The same point also applies in regard to overloads in directions perpendicular to the direction of the arrow F. In the opposite direction to the arrow F, the arrangement can readily be subjected to a loading up to the limit of the tensile loading which in any case is very high in relation to strips of this nature.

Because of the resiliency of the cambered strip, the fact of winding the strip 3 on to the winding member 4 gives rise to an unwinding moment, in other words, the strip 3 seeks to unwind itself from the member 4 and thus to move its free end in the opposite direction to that indicated by the arrow F. If the above-described apparatus is used for converting a rotary movement into a linear movement and if for that purpose the winding member 4 is driven for example by means of a drive transmission arrangement, it is then sufficient, for the purposes of unwinding of the strip 3, for the winding-on torque which is produced for example by electric motor means to be made somewhat lower than the above-mentioned unwinding torque which the strip itself produces, in order to ensure that, in the case for example of a gear transmission arrangement, the same sides of the teeth are always in contact with each other. That makes it possible entirely to eliminate back-lash which occurs between the sides of the teeth of the gears in any gear-type transmission.

In cases in which the unwinding moment exerted by the strip 3 causes problems, the strip 3 may additionally be cambered in its longitudinal direction, in other words it may be prestressed resiliently in such a way that the resulting winding-on moment reduces, compensates for or even over-compensates for the unwinding moment. In the last-mentioned case the strip has a tendency to wind itself automatically on to the member 4. Mutual compensation of the two winding moments, which is as good as possible, is of advantage when the intention is to ensure that no uncontrolled winding-on or unwinding movements occur for example in the event of failure or rupture of the unwound part of the strip or of the drive arrangement.

In addition it is possible for different portions of the strip to be cambered to different degrees, or not cambered, in the longitudinal direction thereof. In that way, depending on which portions of the strip are just being wound on to or unwound from the winding member 4, it is possible to produce a precisely defined winding-on moment or unwinding moment, or a neutral winding behaviour, in which respect the magnitude of the winding-on and/or unwinding moments may be further additionally varied.

Figure 3:
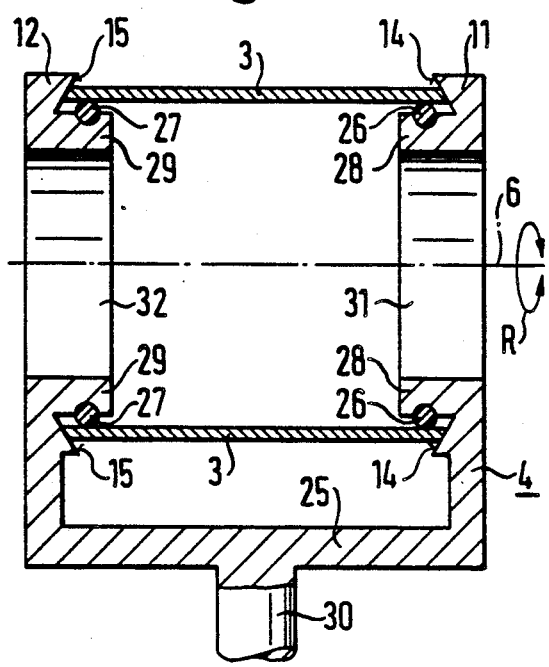
FIG. 3 is a view in section corresponding to the view shown in FIG. 2 through a second embodiment of the apparatus according to the invention, which can be used for changing the direction of a cambered strip and/or for converting a translatory movement into a rotary movement or vice-versa.

Referring now to FIG. 3, the embodiment illustrated therein shows that it is possible for the inner part of the rotary member (winding member 4 for example in FIGS. 1 and 2) to be completely omitted so that all that then remains are the two flange portions 11 and 12 which in this case are in the form of circular rings which, in their lower region in FIG. 3, are connected together by way of a forked structure 25 in such a way that they are pre-stressed towards each other with a predeterminable force. In that way they can clamp between them the strip 3 which in this case bears with its side surfaces against the annular lateral support surfaces 14 and 15, both in the upper part in FIG. 3 and also in the lower part in FIG. 3. The support surfaces 14 and 15 are provided on the mutually facing surfaces of the flange portions 11 and 12. In this embodiment, the contact surface is afforded by first and second O-rings 26 and 27 which are fitted into axially inwardly projecting shoulders 28 and 29 on the flange portions 11 and 12. The contact surface which forces the strip to take up a position of being longitudinally curved is therefore divided in this embodiment into first and second surfaces which are formed by the radially outward sides of the O-rings 26 and 27. The resilient properties of the O-rings 26 and 27 produce an additional resilient force which, when the respective strip portions are gripped between the contact surfaces and the lateral support surfaces 14 and 15 presses the side surfaces of the strip against the support surfaces 14 and 15.

The arrangement shown in FIG. 3 may be mounted by means of the central trunnion portion 30 which projects downwardly in FIG. 3 on the forked structure 25, in such a way that the FIG. 3 arrangement is pivotable about the axis 6, which is not embodied in specific concrete structure in the FIG. 3 arrangement, in the direction indicated by the double-headed arrow R. Alternatively the entire arrangement may also be held in position by way of the strip 3 itself so that the portion 30 can be pivoted about the axis 6 by a corresponding movement of the strip 3. In both cases the interior of the structure is freely accessible through the lateral openings 31 and 32 in the flange portions 11 and 12. That hollow interior of the arrangement may be used for example for disposing therein a motor and/or transmission arrangement or the like, for producing rotary movement of the illustrated arrangement.

Figure 4:
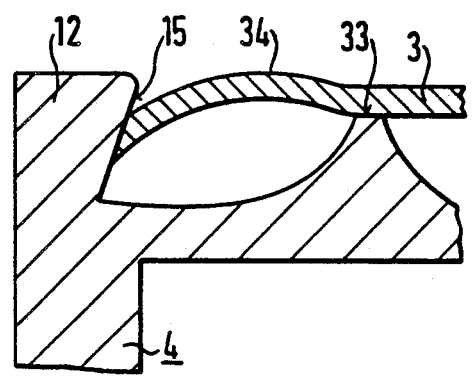
FIG. 4 is a view on a greatly enlarged scale of a detail from a sectional view corresponding to that shown in FIGS. 2 and 3 through a third embodiment in which the strip is clamped with a residual transverse camber between lateral support surfaces of which only one (the left-hand one) is illustrated.

FIG. 4 shows a view on a greatly enlarged scale of a detail, corresponding to the top left corner in FIG. 3, of an embodiment of a somewhat different configuration. FIG. 4 also shows a flange portion 12 which at its radially outward end has one of the two lateral support surfaces, namely the surface 15. One of two support surfaces as indicated at 33 is shown at an axially rather more inwardly disposed position, with the strip 3 bearing against the illustrated support surface 33 with the underside of the strip, in a narrow region thereof. Only one side edge region of the cambered strip 3 is shown in FIG. 4. At the oppositely disposed, right-hand side edge (not shown), the flange portion at that location is of a corresponding configuration. In this construction the support surfaces 33 are not elastic. It will be seen that the strip can also be gripped by its side surface against the respective lateral support surfaces in such a way as to provide a concave outwardly directed curvature as indicated at 34 in the edge region of the strip. The cambered strip does not therefore have to be entirely straightened out or flattened in the transverse direction, when it is gripped between the lateral support surfaces 14 and 15 and the contact surface as indicated for example at 20 in FIGS. 1 and 2. However, this construction also ensures that the connection formed between the cambered strip 3 and the rotary member 4 is very strong and can be subjected to a compression loading in the longitudinal direction of the strip 3.

Figure 5A:
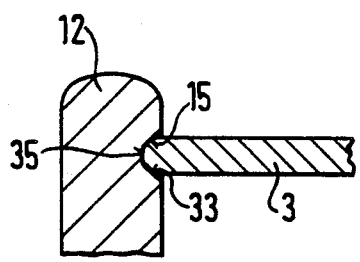
FIGS. 5a and 5b are detail views in section corresponding to the view shown in FIG. 4 through a fourth and a fifth embodiment of an apparatus according to the invention, showing further possible forms of the contact surfaces and the lateral support surfaces.
Figure 5B:
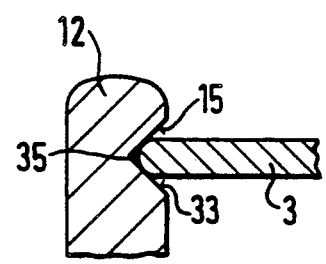

FIGS. 5a and 5b show two views in cross-section, corresponding to that shown in FIG. 4, of details from two further embodiments of the apparatus of the invention, in which the left-hand lateral support surface 15 shown in each of FIGS. 5a and 5b, and the associated contact surface 33, are formed by inside wall regions of a groove 35 which is provided on the inward surface of the respectively illustrated flange portion 12, that inward surface facing towards the oppositely disposed flange portion (not shown). In the construction shown in FIG. 5a, the groove 35 is of a substantially semicircular cross-section while in FIG. 5b it is of a substantially V-shaped configuration. On the respective oppositely disposed right-hand side (not shown), the flange portion at that side has a corresponding groove.

Figure 6A:
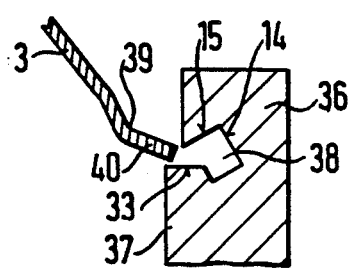
FIGS. 6a and 6b are views in section corresponding to the views shown in FIGS. 4 and 5a and 5b through a sixth embodiment of an apparatus according to the invention in which the cambered strip is only gripped and guided at one side edge.
Figure 6B:
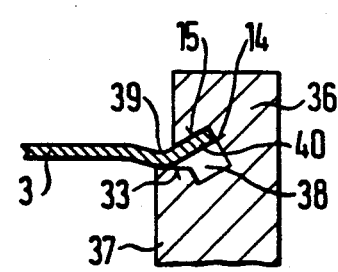

In the above-described embodiments of the apparatus according to the invention the two lateral support surfaces 14 and 15 are always arranged at such a spacing from each other that the cambered strip could pass between them, in respect of its entire width, and could be gripped between them, by way of the side surfaces of the strip. In contrast, the embodiment shown in FIGS. 6a and 6b provides that the cambered strip 3 is gripped only at one lateral edge as illustrated in FIGS. 6a and 6b, while the oppositely disposed edge region remains entirely free. This embodiment of the guide apparatus according to the invention therefore has only a single holding and guide member 36 which, in a side surface 37 thereof, which is towards the strip 3, has a groove 38 on which both the contact surface 33 and also the two lateral support surfaces 14 and 15 are formed. At its lateral edge which is towards the member 36, the strip 3 has a bent portion 39 which is bent in the opposite direction to its camber configuration and the radius of curvature of which, in comparison with the radius of curvature of the camber configuration, is so small that it is maintained even when the transverse curvature of the strip 3 is practically completely eliminated, as shown in FIG. 6b. In that way, due to the increase in width of the strip 3 due to the transverse camber thereof being flattened out, the bent edge region 40 can pass into the groove 38 where it is gripped in position between the contact surface 33 and the two lateral support surfaces 14 and 15. For that purpose the lateral support surfaces 14 and 15 in this embodiment also are of such a configuration that they are disposed in opposite relationship to the contact surface 33 and converge towards each other away from the surface 33. The construction again provides a connection between the cambered strip 3 and the member 36, which is a very strong connection and capable of resisting a compression force applied to the strip in the longitudinal direction thereof.

Figure 7:
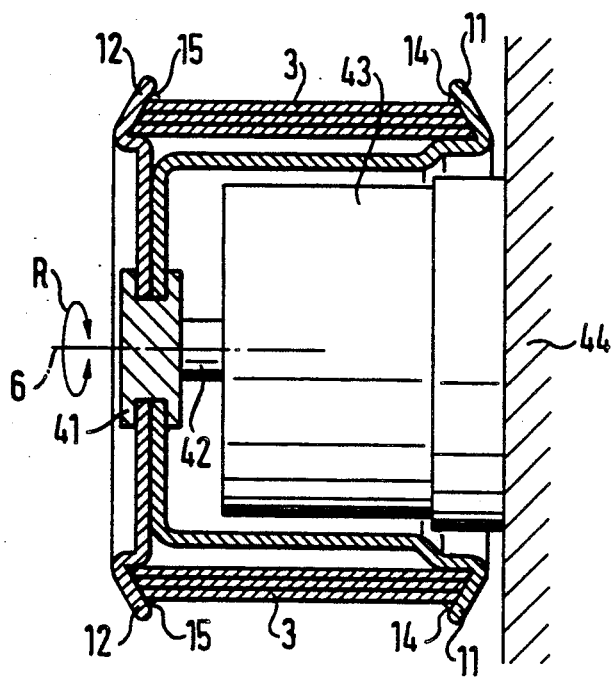
FIG. 7 is a view of a seventh embodiment of the apparatus according to the invention in which the winding member has a hollow interior for disposing a drive device therein.

FIG. 7 again shows an embodiment in which the cambered strip 3 is gripped between two mutually oppositely disposed flange portions. The flange portion 12 which is shown at the left in FIG. 7 is generally in the form of a circular disc while the right-hand flange portion 11 is in the form of a cup or bowl structure which is open towards the right and which bears with its bottom against the inside surface, which is there towards, of the left-hand flange portion 12, being fixedly connected thereto by way of a suitable connecting arrangement as indicated at 41. The connecting arrangement 41 is carried by a shaft 42 of a motor and transmission assembly 43 which is disposed in the interior of the cup-shaped flange portion 11 and which is mounted with its side at the right in FIG. 7 to a support structure 44. In this case therefore the rotary member formed by the connecting arrangement 41 and the two flange portions 11 and 12 can be freely rotated and can be used for example for winding on and unwinding a cambered strip in a plurality of turns, as shown in FIG. 7. It will be clearly seen that in this case also the width of the cambered strip must vary over the length thereof so that the strip portions which are gripped between the support surfaces 14 and 15 at further outwardly disposed locations can come to bear smoothly against the strip portions which have already been wound on to the rotary member and which are thus at a more radially inwardly disposed location thereon.

Figure 8:
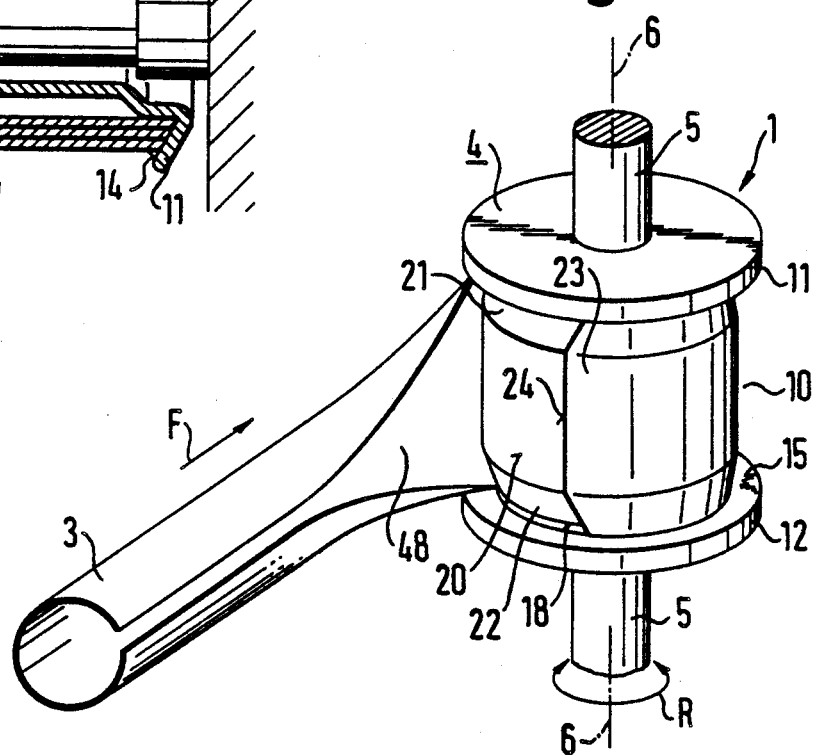
FIG. 8 is a perspective view of an eighth embodiment of the apparatus according to the invention for winding on and unwinding a heavily cambered strip.

FIG. 8 shows an embodiment of an apparatus according to the invention in which the cambered strip is curved to such an extent that it is of an almost circular cross-section in the portions thereof which have been unwound from the apparatus. In that way the resistance to bending and buckling of the strip 3 in directions perpendicular to the direction indicated by the arrow F and also its capacity to carry a compression loading in the direction of the arrow F can be considerably increased. As a strip 3 of that form undergoes a considerably greater increase in its width when it is wound on to the winding member 4, than is the case with the above-described embodiments of the invention, the groove 10 in the member 4 must be of a suitable width. In other respects the construction shown in FIG. 8 comprises the same components as the embodiment shown in FIGS. 1 and 2 so that the same reference numerals are used to denote the same components.

Figure 9:
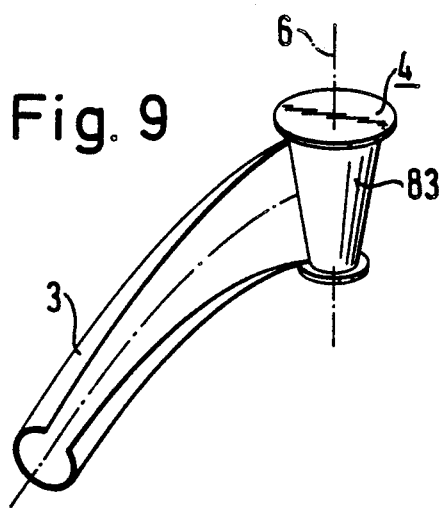
FIG. 9 is a perspective view of a ninth embodiment in which a correspondingly shaped cambered strip can be wound on to and unwound from a contact surface of a frustoconical configuration.

Reference will now be made to FIG. 9 showing a cambered strip 3 which can be wound on to and unwound from a winding member 4 having a contact surface 83 in the form of the peripheral surface of a right truncated cone. In this case also there is no need for the contact surface to extend almost over the entire axial length of the winding member 4. Instead, as is also the case in regard to the embodiments of the invention described hereinbefore, it is possible for the apparatus to have two or more contact surfaces which are of such a configuration and which are so arranged relative to each other that a strip portion which bears against same substantially assumes the shape of at least a portion of the peripheral surface of a truncated cone. It will be appreciated that it is only possible for a cambered strip to be wound smoothly on to such a winding member 4, if the strip has longitudinal side edges which substantially follow the configuration of two circular arcs which are in concentric relationship with each other; the width of the strip may be of a tapering configuration towards the free end, in the same manner as in the above-described embodiments in which the strip has longitudinal side edges which follow substantially two mutually parallel straight lines. When the cambered strip shown in FIG. 9 is unwound from the member 4, it results in an at least partially toric configuration which is bent around the central axis which is perpendicular to the axis of rotation 6 of the winding member 4.

Figure 10:
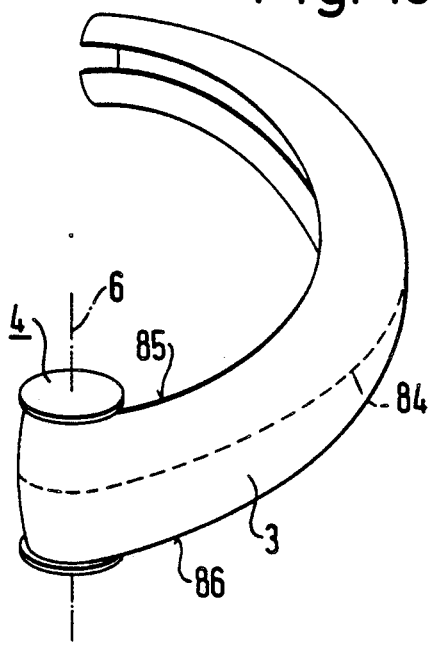
FIG. 10 shows a tenth embodiment in which a cambered strip which is longer in its middle region than the side regions can be wound on to and unwound from a contact surface of a barrel-like configuration.

FIG. 10 shows a cambered strip 3 in which the central region 84 thereof is longer in each differential strip portion in the longitudinal direction thereof than the two associated side regions 85 and 86, due to a rolling operation or some other suitable processing procedure. That means that the strip 3 must be wound on to a contact surface or surfaces which are curved in the configuration of a barrel-like shape and which permit the strip portions bearing against same to assume a barrel-like configuration of that kind.

In this case also, when the cambered strip is unwound from the winding member, the result is an at least partially toric configuration in which however the central axis extends parallel to the axis of rotation or the axis of symmetry of the winding member 4, as indicated at 6.

Figure 18:
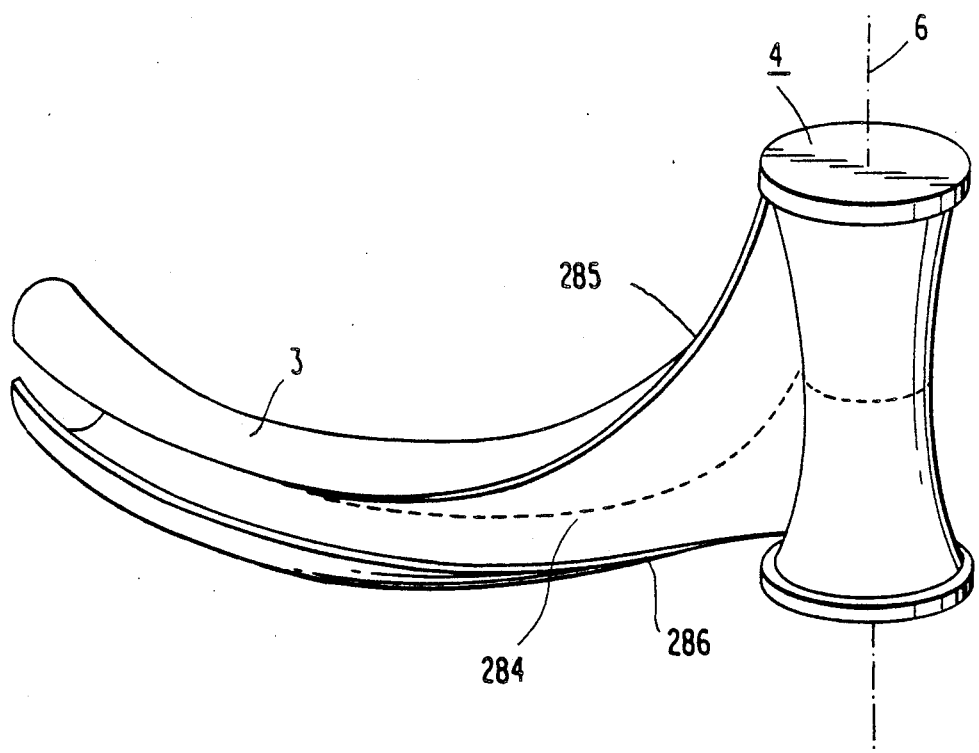
FIG. 18 shows an embodiment in which a cambered strip which is shorter in its middle region than the side regions can be wound on to an unwound from a contact surface of a cushion-like configuration.

Similarly to the above-described embodiment, as shown in FIG. 18, the central region 284 of the strip 3 may also be shorter in each differential portion thereof in the longitudinal direction of the strip than the respectively associated side regions 285 and 286, by virtue of suitable processing. The contact surface is then of a configuration referred to as being 'cushion-shaped', and the torus or torus portion which is formed when the strip is unwound is curved in the opposite direction to that shown in FIG. 10.

The embodiments shown in FIGS. 9 and 10 may be used to advantage wherever the free end of the strip 3 is connected to a member which, by virtue of a rotary movement of the winding member 4 about its axis of rotation 6, is intended to be moved on a suitably curved path, as is the case for example when extending landing flaps on aircraft aerofoils.

Figure 11:
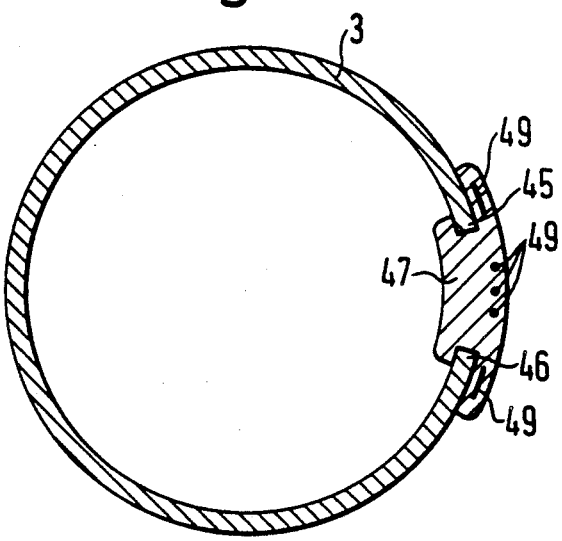
FIG. 11 is a view on an enlarged scale in section transversely with respect to the longitudinal direction of a cambered strip, through the part thereof which has been unwound, similarly to the strip shown in FIG. 8, but which is combined together with an auxiliary strip to provide for enhanced stability.

In order still further to increase the stability in respect of compression and buckling forces of the unwound portion of the strip, a further embodiment of the apparatus according to the invention, in respect of which FIG. 11 shows only a view in cross-section through the unwound portion of the strip 3, provides that the free side edges 45 and 46 of the strip 3 engage into corresponding recesses of an auxiliary strip 47 which is of substantially H-shaped cross-section; in the transitional region of the strip between the part of the strip 3 which is unwound and the part of the strip 3 which is wound on to the winding member 4, with the transitional region being identified by reference numeral 48 in FIG. 8, the auxiliary strip 47 comes out of the engaged condition shown in FIG. 11 when the strip 3 is wound on to the winding member 4, and goes into that engaged condition when the strip 3 is unwound. The auxiliary strip 47 may be wound on to the winding member 4 jointly with the strip 3, or it may be wound on to its own winding member (not shown) separately from the strip 3.

In the former case, it may be desirable for the inward side of the cambered strip 3 to carry a coating or covering, the thickness of which is at least equal to the thickness of the auxiliary strip 47 and which has a recess extending in the longitudinal direction of the cambered strip, into which the auxiliary strip 47 becomes embedded when the strip is wound on to the winding member. In that way, when using a very narrow auxiliary strip 47, the cambered strip enjoys improved contact against the respective strip portion which is wound on to the winding member beneath same. In addition electrical and/or compressed air lines can be disposed in the coating or covering.

As FIG. 11 further shows, electrically conductive wires 49 or other lines for the transmission of energy or information signals may also be provided in the interior of the auxiliary strip 47. The above-mentioned lines may be taken for example to a drawing, writing or gripping device disposed at the free end of the strip 3. Alternatively it is also possible to use the cambered strip 3 and/or the auxiliary strip 47 itself for energy and/or signal transmission, if the strip in question comprises a conductive material.

Figure 12:
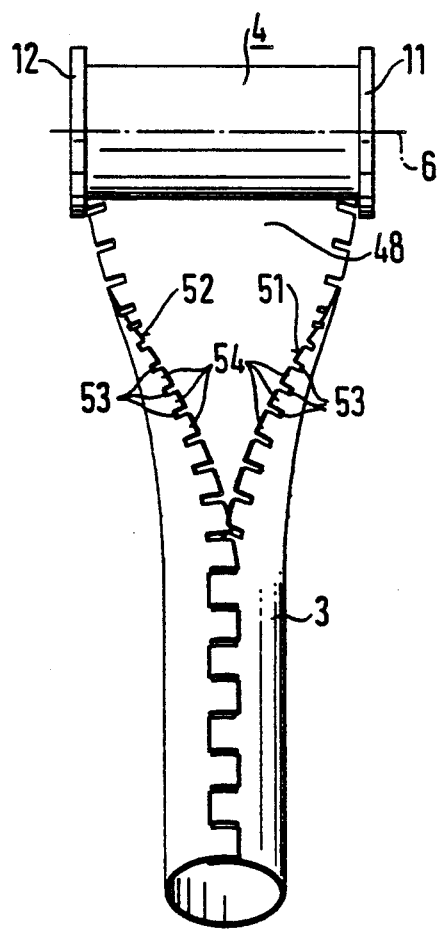
FIG. 12 shows a strip which is similar to the cambered strip of FIGS. 8 and 11 and which is closed to form a tubular cross-section with the side edges thereof coming into meshing engagement with each other, when the strip is unwound from a winding member.

Reference will now be made to FIG. 12 showing a cambered strip 3 which is partially unwound from a winding member 4 and which is so substantially cambered that the side edge regions of its unwound portions not only come together to form a closed cross-section but even overlap somewhat. Slots 53 which extend perpendicularly to the edges 51 and 52 of the strip 3 divide the edges of the strip into tongue portions 54 which are alternately bent over somewhat inwardly and outwardly respectively. In that case, of two tongue portions 54 which are disposed in precisely opposite relationship, one is always bent inwardly and the other is always bent outwardly. In that way, as shown in the lower part of FIG. 12, those tongue portions 54 can come into crossing-over and clasping relationship with each other and can thus considerably enhance the stability of the unwound strip portions.

Figure 13:
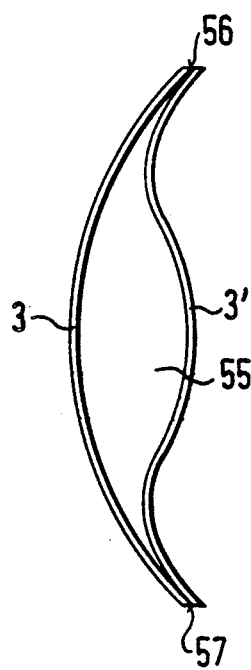
FIG. 13 is a view in cross-section corresponding to that shown in FIG. 11 through the unwound portion of first and second cambered strips which are connected together, in accordance with a further embodiment.

Referring now to FIG. 13, shown therein is a view in cross-section, corresponding to the view shown in FIG. 11, through a strip portion which has not been wound on to a winding member, in a further embodiment of the apparatus of the invention, in which two cambered strips 3 and 3' are arranged with their respective curvatures in opposite relationship to each other and are connected together in the vicinity of their lateral edges in such a way that they enclose a hollow space 55 which extends in the longitudinal direction of the strip assembly. Such a strip assembly which has a particularly high level of rotational stiffness may also be wound on to a winding member, in which case the transverse camber configurations of the two strips 3 and 3' are simultaneously flattened.

It can also be particularly clearly seen from FIG. 13 that the side surfaces 56 and 57 of the strip 3 are bevelled or chamferred in order to provide for adaptation thereof to the inwardly inclined lateral support surfaces of the respective winding member on to which the FIG. 13 strip assembly 3, 3' is wound. Such a bevelled or chamferred configuration may also be advantageous in the embodiments described hereinbefore with reference to the preceding Figures of the drawings.

FIG. 14 shows an embodiment which essentially differs from the FIG. 8 embodiment in that neither of the ends of the strip is fixed to the rotary member 4. On the contrary the strip 3 is passed with a portion of its length, extending in the groove 10, around a part of the periphery of the surface 20 so that the two ends of the strip (not shown) are free and can perform movements which depend on the use of the apparatus.

For example, the arrangement can serve as a pivotal connection for three members which are respectively connected to respective ones of the free ends of the strip and to the rotary member 4 respectively. In that situation the rotary member 4 can be held fast in regard to the axis of rotation 6 thereof. The members which are connected to the free ends of the strip can perform pivotal movements, as indicated by the double-headed arrows S and S'.

Another possible use lies in use as a transmission arrangement in which two intercoupled translatory movements of the ends of the strip in the directions indicated by the double-headed arrows F and F' are converted into a rotary movement of the rotary member 4 in the direction indicated by the double-headed arrow R in FIG. 14. If conversely the shaft 5 of the rotary member 4 is driven to produce a rotary movement, that movement is converted into two mutually opposite translatory movements of the ends of the strip. It is also possible to involve a combination of pivotal and transmission properties.

A further possible use of the apparatus of the invention provides connecting together the two free ends of the cambered strip 3 so that the strip 3 forms an endless loop passing around two or more transverse axes. A rotary member 4 as shown in FIG. 14 is then disposed at at least one of the transverse axes while corresponding rotary members or simple direction-changing rollers may be arranged at the other transverse axis or axes. Such an arrangement is particularly suitable as a caterpillar-type chassis gear, wherein the cambered strip 3 is preferably not of a tubular cross-sectional configuration in its transversely cambered portions, but is in the cross-sectional shape of a stretched C.

In FIG. 15, two cambered strips 3 and 3' can be jointly wound on to a winding member 4 in the groove 10 therein. In that case the peripheral surface 20 formed by the bottom of the groove 10 firstly forms the contact surface for the strip 3', the left-hand side of which in FIG. 15 serves as a contact surface for the strip 3, in the regions of the strip which are wound on to the rotary member 4. When the strips 3 and 3' are wound on to the winding member 4 in a plurality of turns, the left-hand side of the strip 3 in FIG. 15 then in turn forms the contact surface for the strip 3'.

The free ends of the strips 3 and 3' are connected by way of pivotal connections 58 and 58' to a rigid member 59 which in relation to the winding member 4 can perform movements having components both in the direction of the double-headed arrow F and also in the direction of the double-headed arrow S. The pivotal connections 58 and 58' have pivot axes which are parallel to the axis of rotation 6. That arrangement provides that the capacity for twisting of the strips 3 and 3' about their respective longitudinal directions is eliminated and the rigid member 59 can be moved very precisely in one plane.

Figure 16:
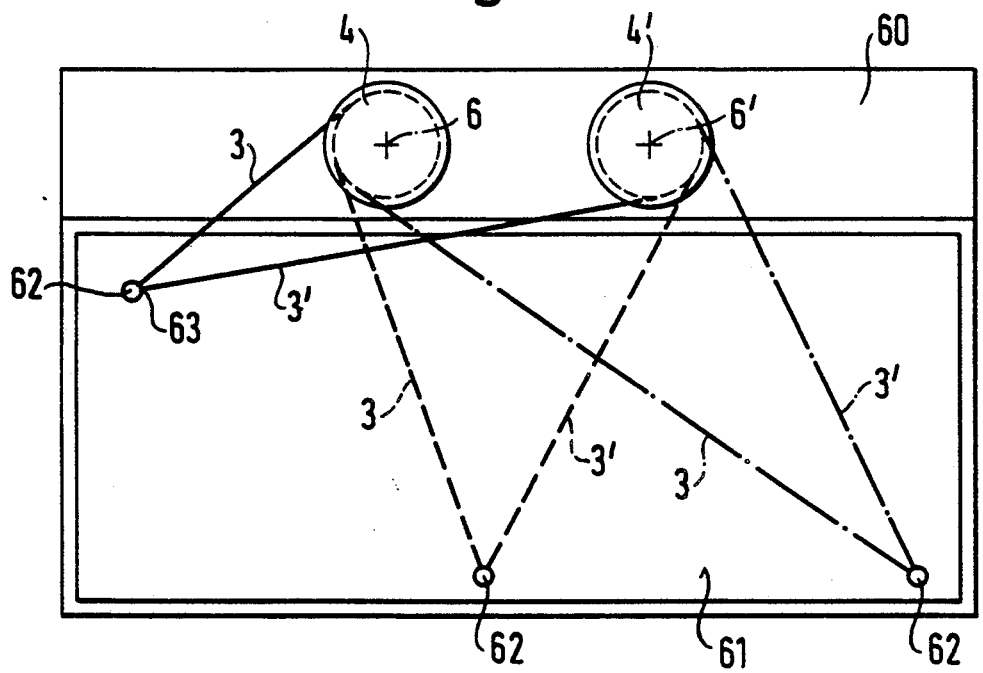
FIG. 16 shows an example of use of two apparatuses according to the invention in a plotter, the apparatuses being combined together to convert first and second rotary movements into a planar movement with two degrees of freedom.

FIG. 16 shows a plan view of a plotter 60 having a drawing surface 61. A pen or stylus 62 which is disposed perpendicularly to the plane of drawing in FIG. 16 is movable over the drawing surface 61, with two degrees of freedom. For that purpose, the winding members 4 and 4' of two apparatuses according to the invention are mounted beside the surface 61 in such a way that their respective axes 6 and 6' are perpendicular to the plane of the surface 61. Each of the two winding members 4 and 4' is driven by its own electric motor which may be for example in the form of a stepping motor, to produce a rotary movement which is independent of the movement of the respective other winding member. The free ends of the two cambered strips 3 and 3', which are not secured to the winding members 4 and 4', are interconnected by way of a pivot 63 which is of a similar configuration to the pivotal connections 58 and 58' in FIG. 15 and which carries the pen or stylus 62. The lengths of the two strips 3 and 3' are such that the pen or stylus 62 can be moved to any point on the surface 61 by suitable actuation of the electric motors driving the members 4 and 4'. FIG. 3 shows by way of example three different positions of the pen or stylus 62: the strips 3 and 3' are shown in one position in solid lines, in a second position in dashed lines and in a third position in dash-dotted lines. It will be readily apparent that each of the three illustrated positions can be transferred into each of the other two positions by suitably shortening or increasing the length of the unwound portions of the strips 3 and 3'.

Figure 17:
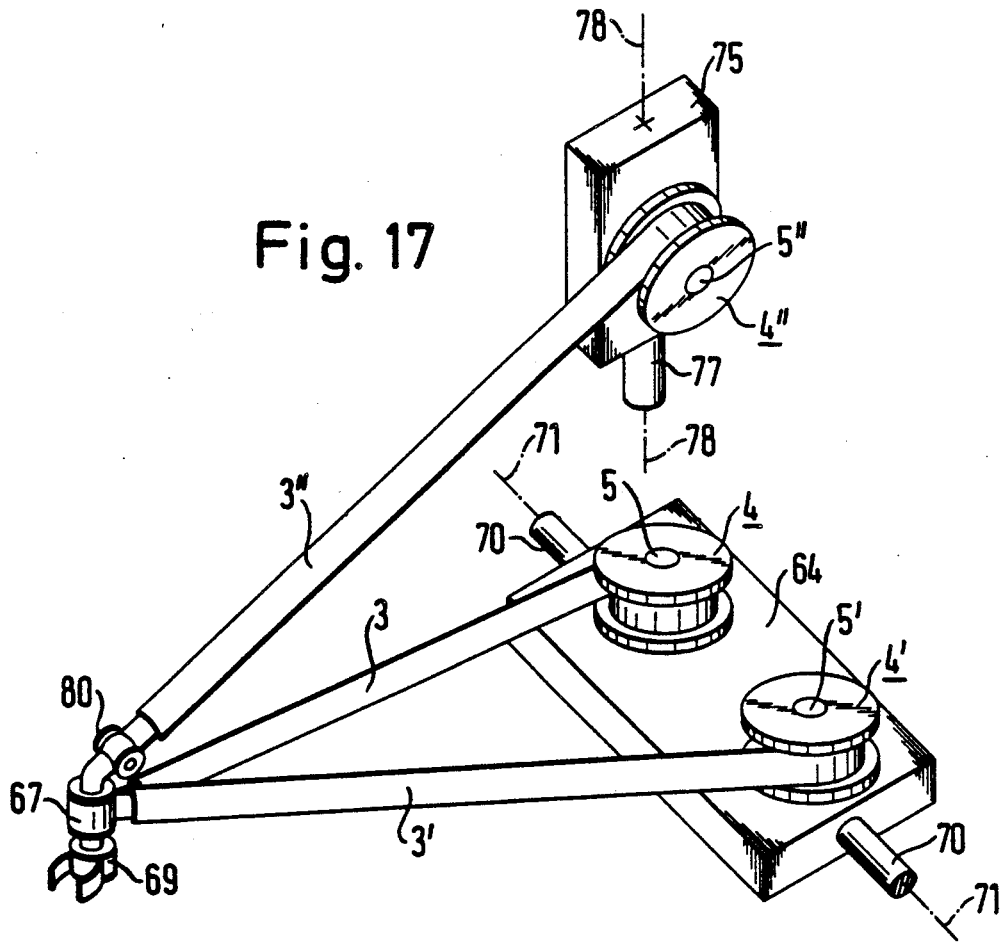
FIG. 17 shows a situation of use in which three apparatuses according to the invention are combined together to convert three rotary movements into a movement with three degrees of freedom.

In the embodiment shown in FIG. 17, the winding members 4 and 4' of first and second apparatuses according to the invention are mounted on a bearer 64 in such a way that their rotary shafts 5 and 5' extend parallel to each other and the cambered strips 3 and 3' thereof extend in a common plane. In this case also the two free ends of the strips 3 and 3' are connected together by way of a pivot 67, the axis of pivotal movement of which extends parallel to the shafts 5 and 5'. The pivot 67 carries a working head 69 which in this construction is in the form of a gripper device.

The bearer 64 is mounted pivotably about a pivot axis 71 which is defined by a shaft 70 and which extends perpendicularly to the axes of the shafts 5 and 5'.

Still referring to FIG. 17, the winding member 4' of a third apparatus according to the invention is mounted rotatably about its shaft 5" on a second bearer 75 which in turn is pivotable about a pivot axis 78 which is defined by a shaft 77 and which is perpendicular to the direction of the pivot axis 71 of the first bearer 64. The free end of the cambered strip 3" of that third apparatus is connected to the free ends of the other two cambered strips 3 and 3' by way of a further pivot 80, the pivot axis of which extends perpendicularly to the axis of the pivot 67.

Each of the three winding members 4, 4' and 4" can be driven by its own electric motor (not shown) to produce a rotary movement which is independent of the rotary movements of the other winding members. In that way the working head 69 can be moved with three degrees of freedom over a large volume. Such an arrangement can be used for example as a manipulator for lifting and displacing loads, wherein the maximum transportable load depends on the thickness, the width, the camber radius, the resiliency, the cross-sectional shape and the material of the strips 3, 3' and 3". It is possible in this case to cover a wide area of use, ranging from micro-manipulators to cranes.

In a modification of or in addition to the above-described embodiments of the apparatus according to the invention, in order to adapt the properties of the cambered strip to the respective purpose to which it is to be put, it is possible for the strip to be made for example from a composite material which, independently of its cambering, that is to say the resilient prestressing thereof in the transverse and/or longitudinal direction, is anisotropic, that is to say it has different properties in the transverse direction from the longitudinal and/or diagonal direction. In addition, by means of the auxiliary strip described by way of example with reference for example to FIG. 11, or independently thereof, it is possible for the strip to be releasably provided with one or more stiffening members which can be formed for example by spiral springs in order to impart enhanced stability in respect of compression and buckling loadings thereto, when the strip comes out of engagement with the contact surface of the rotary member of the apparatus according to the invention and when it makes the transition into the condition of being completely cambered in the transverse direction. When strip portions provided with such stiffening members then move on to a contact surface again, the stiffening members are released as the transverse camber of the strip is increasingly flattened, so that the stiffening members are released from the cambered strip. That can be done by the stiffening members being collected in the vicinity of the respective winding member and being kept in readiness for re-use thereof when the direction of movement of the strip is reversed, or by the stiffening members being passed around the rotary member of the apparatus on a separate path and being brought into engagement again with portions of the strip as they come away from the rotary member. In a development in particular of the construction shown in FIG. 17, multi-dimensional framework structures with variable bar lengths may be constructed from respective pluralities of apparatuses according to the invention. That makes it possible to provide in particular lifting or gripping devices, the tip of which can be passed around corners or edges and can there be moved in all three directions in space.

Finally, attention should also be directed to a quality of an apparatus according to the invention which can be used to advantage in appropriate situations of use. If it is assumed that a cambered strip is partially wound on to a winding member while the other part which includes the free end of the strip is unwound to such an extent that the strip assumes its cross-sectional curvature defined by the cambering configuration and, in regard to the remainder of its configuration, extends along a straight or a curved longitudinal axis, the winding member can be rotated about an axis which is perpendicular to its axis of rotation, by the free end of the strip being turned about the longitudinal axis of the strip. Therefore, in addition to the linear movement defined by the strip being wound on to and unwound from the winding member, that arrangement provides a further 'degree of freedom' as conversely also rotary movement of the winding member about the axis perpendicular to its axis of rotation results in corresponding turning of the end of the strip about the longitudinal axis of the strip.

It will be appreciated that the above-described constructions and uses have been set forth only by way of example and illustration of the invention and that various modifications and improvements can be made therein without departing from the scope of the invention.

What is claimed is:

1. Apparatus for guiding an elongate strip of a stiff material which is prestressed to be cambered in a transverse direction, so that it has a wide transversely concave and a wide transversely convex surface and two narrow side surfaces, said apparatus comprising:

at least one contact surface which to each portion of the strip bearing against it by one of said wide surfaces imposes a longitudinal curvature about a transverse axis, thereby reducing resiliently the transverse camber of said portion of the strip, and first and second lateral support surfaces disposed in mutually opposite relationship in the direction of the transverse axis and being inclined to converge towards each other in a direction away from said transverse axis, said contact surface being arranged between said first and second lateral support surfaces the spacing of which allows each still transversely cambered portion of the strip to enter between said support surfaces and to be conformed to said contact surface, whereby said portion of the strip is subjected to an increase in width when its transverse camber is reduced, wherein said two narrow side surfaces of said strip are inclined at an angle such that the inclination of said narrow side surfaces of any portion of said strip at least substantially corresponds to the inclination of said lateral support surfaces when such a portion of the strip bears against said contact surface, whereby said portion of the strip is gripped immovably in a resiliently reversible manner between said contact surface and said lateral support surfaces in such a manner that said guiding apparatus can take any pressure load which is applied to said strip in its longitudinal direction towards said guiding apparatus.

2. Apparatus for guiding an elongate strip of a stiff material which is prestressed to be cambered in a transverse direction, so that it has a wide transversely concave and a wide transversely convex surface and two narrow side surfaces, said apparatus comprising:

at least one contact surface which to each portion of the strip, bearing against it by one of said wide surfaces imposes a longitudinal curvature about a transverse axis, thereby reducing resiliently the transverse camber of said portion of the strip, and first and second lateral support surfaces disposed in mutually opposite relationship in the direction of the transverse axis and being inclined to converge towards each other in a direction away from said transverse axis, wherein said contact surface and said first and second lateral support surfaces define boundary surfaces of a lateral guide groove means being arranged to come into engagement with one side edge region of at least a portion of said strip, and wherein said strip is provided along said side edge region thereof with a transversely bent side edge portion the curvature of which is opposite to the curvature of said transverse camber of the strip, said bent side edge portion remaining bent and entering into said lateral guide groove means and being immovably gripped therein, when said portion of the strip is conformed to said contact surface so that the transverse camber of said portion of the strip is resiliently reduced, the immovably gripped portion of the strip being sufficiently long to take any pressure load which is applied in the longitudinal direction of the strip towards said guiding apparatus.

3. Apparatus according to claim 1 or 2, wherein said contact surface is of a resilient configuration.

4. Apparatus according to claim 1 or 2, wherein said contact surface imposes to a portion of the strip which bears thereagainst the form of at least a portion of the peripheral surface of a cylinder of circular section.

5. Apparatus according to claim 1 or 2, wherein said contact surface imposes to a portion of the strip which bears thereagainst the form of at least a portion of the peripheral surface of a spiral cylinder.

6. Apparatus according to claim 1 or 2, wherein said contact surface imposes to a portion of the strip which bears thereagainst the form of at least a portion of the peripheral surface of a truncated cone.

7. Apparatus according to claim 1 or 2, wherein the central region of the cambered strip is longer in a section-wise manner in the longitudinal direction of the strip than the side edges of the strip and wherein said contact surface imposes to a portion of the strip which bears thereagainst the form of at least a portion of a surface which is of a barrel-like cross-section.

8. Apparatus according to claim 1 or 2, wherein the central region of the cambered strip is shorter in a section-wise manner in the longitudinal direction of the strip than the side edges of the strip and wherein said contact surface imposes to a portion of the strip which bears thereagainst the form of at least a portion of a surface which is of a cushion-like cross-section.

9. Apparatus according to claim 1 or 2, wherein the smallest radius of curvature of said contact surface is larger than the radius of curvature of the chamber of the strip in the transverse direction.

10. Apparatus according to claim 1 or 2, for guiding a plurality of elongate strips which are prestressed to be cambered in a transverse direction, wherein said apparatus includes first and second lateral support surfaces and a contact surface for said plurality of strips.

11. Apparatus according to claim 10, wherein said apparatus includes a contact surface and first and second lateral support surfaces for each of said strips.

12. Apparatus according to claim 10 and further including a surface portion adapted to form at least an initial portion of said contact surface for one of said strips while the other strips bear against respective contact surface portions, each of which is formed by the outward surface of a strip bearing against another contact surface portion.

13. Apparatus according to claim 1, including two contact surfaces which are at least substantially parallel to each other and each of which is formed by a surface strip portion which is narrow in comparison with the width of said cambered strip, one of said contact surfaces being disposed in the vicinity of the one of said lateral support surfaces and the other said contact surface being disposed in the vicinity of the other said lateral support surface.

14. Apparatus according to claim 1, wherein a respective recess is provided at each side of said contact surface where it merges into each of said lateral support surfaces, into which recesses the side edges of a still cambered portion of said strip may enter when said portion comes to bear against said contact surface, whereby said side edges are allowed to move freely towards said support surfaces as said camber of said portion is reduced.

15. Apparatus according to claim 11, comprising a rotary member which has an axis of symmetry extending transversely with respect to the longitudinal direction of said strip and which provides said contact surface and said lateral support surfaces.

16. Apparatus according to claim 2, comprising a rotary member which has an axis of symmetry extending transversely with respect to the longitudinal direction of said strip and which is formed by a disc having a flat side providing a guide groove means which is concentric with respect to said axis of symmetry, said guide groove means having boundary surfaces partly formed by said contact surface and said lateral support surfaces.

17. Apparatus according to claim 15, wherein the peripheral surface of said rotary member includes a recess in which at least a portion of said contact surface is disposed, said recess having side walls including said lateral support surfaces, and a bottom forming at least a portion of said contact surface, and wherein said rotary member has a raised portion extending from the bottom of said recess radially outwardly towards the peripheral surface of the rotary member, the outwardly facing peripheral surface of said raised portion forming at least a portion of said contact surface.

18. Apparatus according to claim 15, wherein said rotary member comprises first and second discs which are spaced from each other in the direction of said axis of symmetry, each of said discs on its flat side which is towards the respective other disc providing a respective one of said lateral support surfaces and a contact surface.

19. Apparatus according to claim 1, wherein said apparatus comprises a winding member to which a first end of said strip is secured, the adjoining end portion of said strip bearing against said contact surface and being gripped between said lateral support surfaces, whereby, when the strip is wound on the winding member in a plurality of turns, said contact surface is firstly formed by a surface portion of said winding member and is then formed by the outwardly facing surface of respective portions of said strip which are already wound on said winding member, and wherein said strip tapers from said end secured to said winding member towards the other end of said strip.

20. Apparatus according to claim 1 or 2, wherein in addition to said prestress producing a camber in transverse direction said strip is also prestressed in the longitudinal direction and wherein the spring constants respectively produced by the prestresses are matched to each other to provide a predeterminable winding and unwinding moment for the strip.

21. Apparatus according to claim 20, wherein the magnitude of the spring constant produced by the prestress of the strip in the longitudinal direction is variable over the length of the strip.

22. Apparatus according to claim 20, wherein the sign of the spring constant produced by the prestress of the strip in the longitudinal direction is variable over the length of the strip.

23. Apparatus according to claim 20, wherein said spring constants are matched to each other in such a way that the unwinding moment produced by the transverse prestress of the strip is compensated by the winding-on moment produced by the longitudinal prestress of the strip.

24. Apparatus according to claim 1 or 2 and further including an auxiliary strip which, in regions of said first cambered strip which do not bear against said contact surface, is adapted to come into engagement with the side edges of said first strip whereby the strips co-operate to form a closed structure in cross-section.

* * * * *